(12) United States Patent
Kim et al.

(10) Patent No.: US 11,733,428 B2
(45) Date of Patent: Aug. 22, 2023

(54) SELF-POWERED APPARATUS FOR MEASURING PRECIPITATION AND METHOD FOR CONTROLLING THE SAME

(71) Applicant: National Institute of Meteorological Sciences, Seogwipo-si (KR)

(72) Inventors: Geon Tae Kim, Gangneung-si (KR); Seon Jeong Kim, Gangneung-si (KR); Jin Hwa Lee, Gangneung-si (KR); Ji Seon Bak, Seoul (KR); Baek Jo Kim, Seoul (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/862,781

(22) Filed: Jul. 12, 2022

(65) Prior Publication Data

US 2023/0052633 A1 Feb. 16, 2023

(30) Foreign Application Priority Data

Aug. 11, 2021 (KR) .......................... 10-2021-0106366

(51) Int. Cl.
*G01W 1/14* (2006.01)
*G08B 21/18* (2006.01)

(52) U.S. Cl.
CPC ............. *G01W 1/14* (2013.01); *G08B 21/182* (2013.01)

(58) Field of Classification Search
CPC . G01W 1/14; G01W 1/10; G01W 1/06; F21V 29/90; G01G 5/00; G06T 2207/30192
See application file for complete search history.

(56) References Cited

U.S. PATENT DOCUMENTS

| | | | |
|---|---|---|---|
| 2002/0140533 A1* | 10/2002 | Miyazaki | H01H 59/0009 335/78 |
| 2008/0184788 A1* | 8/2008 | Jeong | G01W 1/14 73/170.21 |
| 2017/0219410 A1* | 8/2017 | Thomas | F24F 5/0035 |

FOREIGN PATENT DOCUMENTS

| | | | |
|---|---|---|---|
| CN | 203811831 U | * 9/2014 | |
| CN | 111308580 A | * 6/2020 | |
| JP | 61250579 A | * 11/1986 | |
| JP | 07301682 A | * 11/1995 | |
| JP | 07301682 A | 11/1995 | |
| JP | 2001159638 A | 6/2001 | |
| JP | 200600258577 A | 9/2006 | |
| KR | 1020090000868 B1 | 9/2009 | |
| WO | WO-2017010781 A1 | * 1/2017 | ............. G01G 19/40 |

* cited by examiner

*Primary Examiner* — Harshad R Patel
*Assistant Examiner* — Truong D Phan
(74) *Attorney, Agent, or Firm* — Husch Blackwell LLP (57) ABSTRACT

There is disclosed a self-powered apparatus for measuring precipitation, comprising: a housing; a display unit including one or more display lights capable of displaying an amount of precipitation, wherein the display lights are formed on at least one of outer surfaces of the housing; a water collecting vessel, having a funnel-shaped space to which the precipitation is introduced and gathered at a vertex part of the funnel-shaped space; a cup module, having an accommodating space for accommodating the precipitation dropped from the vertex part of the funnel-shaped space of the water collecting vessel; an electric signaling unit; a guiding module; a self-powered generator; and a final drainage opening, formed at a lower part of the housing.

4 Claims, 4 Drawing Sheets

SELF-POWERED APPARATUS FOR MEASURING PRECIPITATION AND METHOD FOR CONTROLLING THE SAME

CROSS REFERENCE TO RELATED APPLICATION

This application claims the benefit of earlier filing date of Korean patent application No. 10-2021-0106366, filed on Aug. 11, 2021, the entire contents of which being incorporated herein by reference.

FIELD OF THE DISCLOSURE

The present disclosure relates to a self-powered apparatus for measuring precipitation and method for controlling the same.

BACKGROUND OF THE DISCLOSURE

A rainfall gauge or a precipitation meter can measure an amount of rainfall or precipitation, and various types of the precipitation meter, such as cylindrical precipitation meter, siphon-type precipitation meter, tipping-bucket-type precipitation meter, weighing-type precipitation meter and surface tension type are used. In general, the amount of the precipitation covers rain, snow, fog, hail, etc. falling from the atmosphere to the ground, while the amount of the rainfall refers to a measurement of rain only falling to the ground. But, in the specification, we are going to use the term "precipitation" as being same as or similar to rainfall.

Among the various types of the precipitation meter, the tipping-bucket-type precipitation meter may record information related to an amount of the precipitation in electric signals, and thus it has advantages of being able to digitally record the information easily and allowing easy automatic observation.

However, in spite of such advantages, the tipping-bucket-type precipitation meter has a disadvantage of being difficult to be installed solely in that it requires other meteorological observation equipment to measure the precipitation. This is because in order to normally operate the tipping-bucket-type precipitation meter, external power supply is necessary and a device for processing the electric signal corresponding to a measured amount of the precipitation must be accompanied. In addition, there is a difficulty in that a separate display device must be installed in order to acquire information on the measured amount of the precipitation.

For reference, in Korea, the tipping-bucket-type precipitation meter is determined to be selected among various types of the precipitation meter. In detail, in Korea, configurations of the tipping-bucket-type precipitation meter such as a size, a resolution, an uncertainty, a material and an operating environment and the like should be set as not deviating from a standard of the Korean National Institute of Meteorological Sciences.

Accordingly, in order to solve the above-mentioned problem while complying with the standard of the Korean National Institute of Meteorological Sciences, a new apparatus for measuring precipitation configured to be capable of self-power generation and to display the amount of precipitation even without the separate display device.

SUMMARY OF THE DISCLOSURE

It is an object of the present disclosure to solve all the aforementioned problems.

It is another object of the present disclosure to provide a self-powered apparatus for measuring an amount of precipitation and displaying information on the amount of precipitation, without using external power, by improving a structure of the existing apparatus for measuring the amount of precipitation.

It is still another object of the present disclosure to provide the self-powered apparatus for measuring the amount of precipitation by being installed without a separate power supply in various places such as regions where there is a risk of waterlogging, flooding of an isolated reservoir and rainfall state of the entrance of an underground tunnel.

It is still yet another object of the present disclosure to provide the self-powered apparatus for measuring the amount of precipitation and displaying information on the amount of precipitation to the observer immediately without a separate display device.

It is still yet another object of the present disclosure to provide the self-powered apparatus for measuring the amount of precipitation and displaying a notice regarding the amount of precipitation at site in real-time even without the separate power supply and the separate display device, and capable of preventing flood damage in the region with high risk of disaster due to precipitation.

In order to accomplish the objects above, distinctive structures of the present disclosure are described as follows.

In accordance with one aspect of the present disclosure, there is provided a self-powered apparatus for measuring precipitation, comprising: a housing in which an inner space is formed; a display unit including one or more display lights capable of displaying an amount of precipitation, wherein the display lights are formed on at least one of outer surfaces of the housing; a water collecting vessel, formed within an upper part of the housing, having a funnel-shaped space to which the precipitation is introduced and gathered at a vertex part of the funnel-shaped space; a cup module, positioned below the water collecting vessel, having an accommodating space for accommodating the precipitation dropped from the vertex part of the funnel-shaped space of the water collecting vessel, wherein, in response to a weight of the precipitation accommodated in the accommodating space exceeding a predetermined threshold, the cup module is moved along a predetermined trajectory to thereby discharge the precipitation accommodated in the accommodating space downwards; an electric signaling unit, formed on a certain area of the inner space, for acquiring information on a movement of the cup module along the predetermined trajectory and generating an electric signal related to the amount of the precipitation, wherein the electric signal serves as a control signal for controlling at least one of the display lights; a guiding module for guiding the precipitation discharged from the cup module to be moved to a triggering point opening formed on a lower part thereof; a self-powered generator for converting potential energy of the precipitation to electric energy by using the precipitation falling from the triggering point opening to the self-powered generator; and a final drainage opening, formed at a lower part of the housing such that the precipitation having been used in generating the electric energy by the self-powered generator is finally drained.

As one example, there is provided a self-powered apparatus for measuring precipitation wherein the self-powered generator includes: a waterwheel that transforms the potential energy of the precipitation to kinetic energy corresponding to rotational motion as the precipitation dropping downwards from the triggering point opening strikes at least one surface thereof; a generating unit for transforming the kinetic energy to the electric energy; and an internal storage battery capable of storing the electric energy generated by the generating unit.

As one example, there is provided a self-powered apparatus for measuring precipitation wherein the cup module includes: a first cup having a first accommodating space positioned in a first direction from a separation unit formed at a central part thereof and a second cup having a second accommodating space positioned in a second direction from the separation unit formed at the central part thereof, and wherein, in response to the weight of the precipitation filling the first accommodating space exceeding the predetermined threshold, the first cup tilts to the first direction by the weight of the precipitation to thereby discharge the precipitation accommodated in the first accommodating space through the guiding module, and, in response to the precipitation dropped from the water collecting vessel filling the second accommodating space while the precipitation accommodated in the first accommodating space is discharged through the guiding module, the second cup tilts to the second direction by the weight of the precipitation to thereby discharge the precipitation accommodated in the second accommodating space through the guiding module.

As one example, there is provided a self-powered apparatus for measuring precipitation wherein the cup module further includes: a (1-1)-st metal extruding rod formed on a lower surface of the first cup; a (1-2)-nd metal extruding rod formed on a lower surface of the second cup; and a reed switch module formed on a lower surface of the central part of the cup module, wherein a (2-1)-st metal extruding rod is formed on a first surface of the reed switch module such that the (2-1)-st metal extruding rod is in contact with the (1-1)-st metal extruding rod according to tilting of the first cup to the first direction and wherein a (2-2)-nd metal extruding rod is formed on a second surface of the reed switch module such that the (2-2)-nd metal extruding rod is in contact with the (1-2)-nd metal extruding rod according to tilting of the second cup to the second direction, and wherein, in response to the weight of the precipitation filling the first accommodating space exceeding the predetermined threshold, the first cup tilts to the first direction by the weight of the precipitation to thereby make first contacts between the (1-1)-st metal extruding rod and the (2-1)-st metal extruding rod, and, in response to the precipitation dropped from the water collecting vessel filling the second accommodating space while the precipitation accommodated in the first accommodating space is discharged through the guiding module, the second cup tilts to the second direction by the weight of the precipitation to thereby make second contacts between the (1-2)-nd metal extruding rod and the (2-2)-nd metal extruding rod, and wherein the electric signal is generated based on the first contacts and the second contacts in a pulse form.

As one example, there is provided a self-powered apparatus for measuring precipitation wherein, on condition that the display unit is electrically connected to the electric signaling unit and the self-powered generator, the display unit acquires the electric signal related to the amount of precipitation from the electric signaling unit, and acquires the electric energy for lighting at least one of the display lights, and wherein, in response to detecting that a unit amount of precipitation measured by referring to the electric signal in the pulse form delivered from the reed switch module is closest to a specific reference value among a 1-st precipitation reference value to an n-th precipitation reference value, the electric signaling unit transmits, to the display unit, the electric signal that determines a cardinal number of the display lights to be lighted among the display lights included in the display unit or determines one or more colors of the display lights by referring to the specific reference value, or wherein, in response to detecting that the unit amount of precipitation measured by referring to the electric signal in the pulse form delivered from the reed switch module is less than the 1-st precipitation reference value, the electric signaling unit transmits, to the display unit, the electric signal that prevents all of the display lights from being lighted.

As one example, there is provided a self-powered apparatus for measuring precipitation wherein the guiding module includes: a discharge module having a first discharge opening and a second discharge opening for respectively discharging the precipitation dropped from the first cup and the second cup; a first inlet and a second inlet for receiving the precipitation respectively dropped from the first discharge opening and the second discharge opening; and a joining part, having a first inlet and a second inlet for receiving the precipitation respectively dropped from the first discharge opening and the second discharge opening, and a joining space where the precipitation guided through the first inlet and the precipitation guided through the second inlet are joined, wherein the joining part releases the precipitation in the joining space through the triggering point opening formed thereon.

As one example, there is provided a self-powered apparatus for measuring precipitation further comprising: a flow rate relieving opening, installed below the water collecting vessel and above the cup module, for relieving a flow rate of the precipitation dropped from the water collecting vessel and for dropping the precipitation toward the cup module with a relieved flow rate.

According to another aspect of the present disclosure, there is provided a method for controlling a self-powered apparatus for measuring precipitation, comprising steps of: (a) collecting the precipitation introduced to the self-powered apparatus for measuring precipitation in a water collecting vessel, formed within an upper part of a housing, having a funnel-shaped space; (b) discharging the precipitation accommodated in a cup module positioned below the water collecting vessel by the weight of the precipitation accommodated in an accommodating space by allowing the cup module to be moved along a predetermined trajectory, as the precipitation is dropped from a vertex part of the funnel-shaped space of the water collecting vessel and the precipitation is accommodated in the accommodating space of the cup module; (c) acquiring information on a movement of the cup module, by an electric signaling unit that is formed on a certain area of an inner space of the self-powered apparatus for measuring precipitation and that is electrically connected to a display unit including one or more display lights capable of displaying an amount of precipitation, generating an electric signal related to the amount of precipitation by referring to the information on the movement of the cup module, wherein the electric signal serves as a control signal for controlling the display light, and then delivering the electric signal to the display unit, and moving the precipitation to a predetermined triggering point opening, by a guiding module capable of guiding the precipitation discharged downwards from the accommodation space; (d) converting potential energy of the precipitation to electric energy by using the precipitation falling from the triggering point opening to a self-powered generator formed on the certain area of the inner space of the self-powered apparatus and electrically connected to the display unit, and delivering the electric energy to the display unit; and (e)

lighting at least part of the plurality of display lights included in the display unit to correspond to the electric signal by using the electric energy delivered from the self-powered generator and the electric signal delivered from the electric signaling unit.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
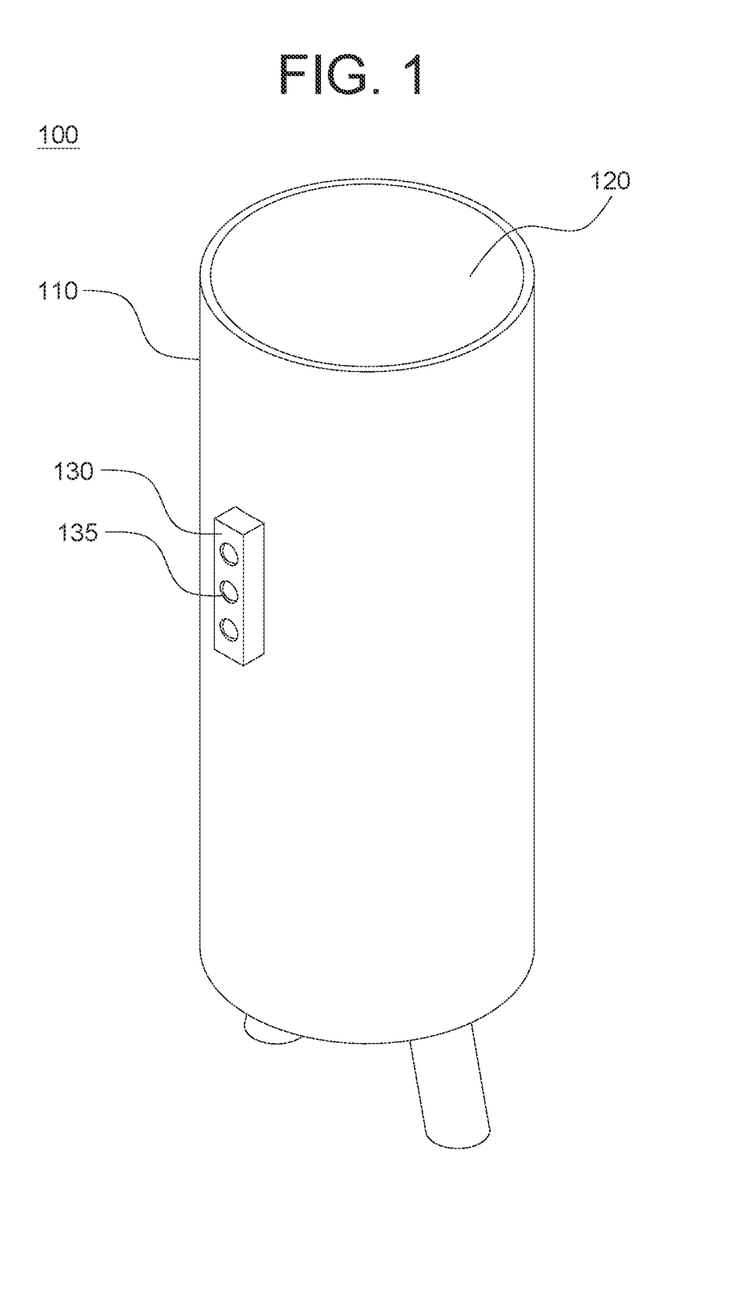
FIG. 1 is a drawing schematically representing an external appearance of a self-powered apparatus for measuring precipitation in accordance with one example embodiment of the present invention.

FIG. 1 is a drawing schematically representing an external appearance of a self-powered apparatus 100 for measuring precipitation in accordance with one example embodiment of the present invention.

Referring to FIG. 1, the self-powered apparatus 100 for measuring precipitation includes a housing 110, a water collecting vessel 120, and a display unit 130 including one or more display lights 135.

Herein, the water collecting vessel 120 may be formed as an inlet at the upper part of the housing 111. Herein, the water collecting vessel 120 has a predetermined space such that the precipitation accommodated in the predetermined space of the water collecting vessel 120 can be introduced to the self-powered apparatus 100. Moreover, the water collecting vessel 120 may be funnel-shaped such that the precipitation introduced to the self-powered apparatus 100 can be gathered at a vertex part of the water collecting vessel 120, and the display unit 130 may be formed on at least one of outer surfaces of the housing 110 to display an amount of precipitation.

Herein, FIG. 1 shows that 3 display lights 135 are attached to the left of the outer surface of the housing 110 in a vertical direction, but the numbers and the attached positions of the display lights 135 included in the display unit 130 are not limited thereto.

Next, the internal structure of the self-powered apparatus for measuring precipitation is explained with a reference to FIG. 2 as follows.

Figure 2:
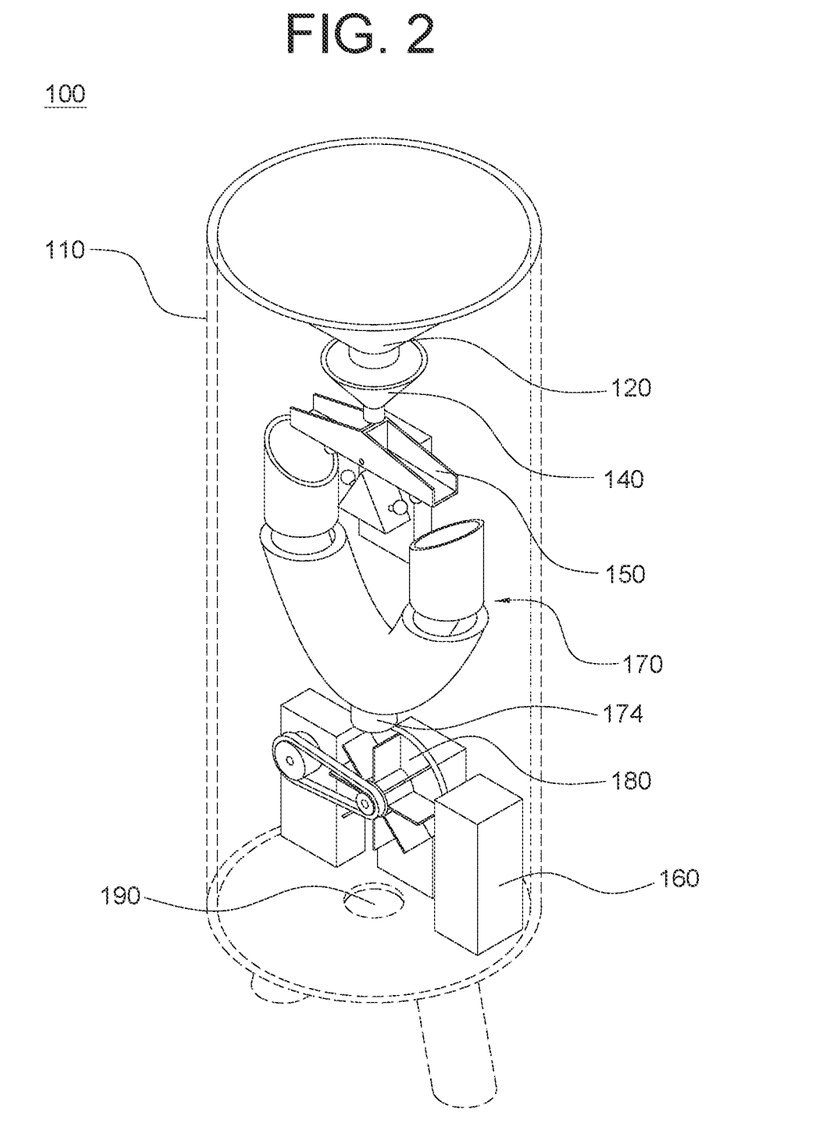
FIG. 2 is a drawing representing a schematic diagram of a structure of the self-powered apparatus for measuring precipitation in accordance with one example embodiment of the present invention.

FIG. 2 is a drawing schematically representing a structure of the self-powered apparatus 100 for measuring precipitation in accordance with one example embodiment of the present invention.

Referring to FIG. 2, the self-powered apparatus for measuring precipitation further includes in its inner space, a cup module 150, an electric signaling unit 160, a guiding module 170 having a discharging part, a joining part and a triggering point opening 174, a self-powered generator 180, and a final drainage opening 190. Herein, the housing 110, the lower part of the housing 110 and a support for the housing 110 are drawn in dotted lines to clarify the configuration of parts in the housing 110.

Further, the cup module 150, positioned below the water collecting vessel 120, having an accommodating space for accommodating the precipitation dropped from the water collecting vessel 120. Herein, in response to a weight of the precipitation accommodated in the accommodating space exceeding a predetermined threshold, the cup module is moved along a predetermined trajectory to thereby discharge the precipitation accommodated in the accommodating space downwards. The process of discharging the precipitation downwards from the cup module 150 will be explained below specifically in FIG. 3. Herein, the predetermined threshold is a preset weight and can be set differently depending on an environment where the self-powered apparatus 100 is installed.

Next, the electric signaling unit 160 is formed on a certain area of the inner space, and may acquire information on the movement of the cup module 150 and generate electric signal related to the amount of precipitation. Herein, the electric signal may be a control signal for controlling the display lights 135. Herein, FIG. 2 shows that the electric signaling unit 160 is formed on a lower right part of the inner space, but it is not limited thereto, and it can be formed on one of various regions of the inner space depending on a size and a shape of the self-powered apparatus 100.

Next, the guiding module 170 formed beneath the cup module 150 may guide the precipitation discharged from the cup module 150 to be moved to a predetermined triggering point opening 174. The process of guiding the precipitation to the triggering point opening 174 will be specifically explained in FIG. 3.

Next, the self-powered generator 180 may include a waterwheel, etc. formed on a certain area of the inner space. As the precipitation drops downwards from the triggering point opening 174, the self-powered generator 180 may allow the potential energy of the precipitation to be transformed to kinetic energy by rotating the waterwheel and then allow the kinetic energy to be transformed to electric energy. Herein, the transformation to the electric energy using the waterwheel will be specifically explained in FIG. 3.

Next, the final drainage opening 190 is formed at a lower part of the housing 110 such that the precipitation having been used in generating the electric energy by the self-powered generator 180 is finally drained. Herein, FIG. 2 shows that the final drainage opening 190 is formed at a center of the housing 110, but depending on a size, a shape and a position of the self-powered generator 180, it can be formed in an area other than the center, and the position and the shape of the final drainage opening 190 will not be limited thereto.

Next, the operation of the self-powered apparatus 100 performed by using introduced precipitation can be explained with reference to FIG. 3 as follows.

Figure 3:
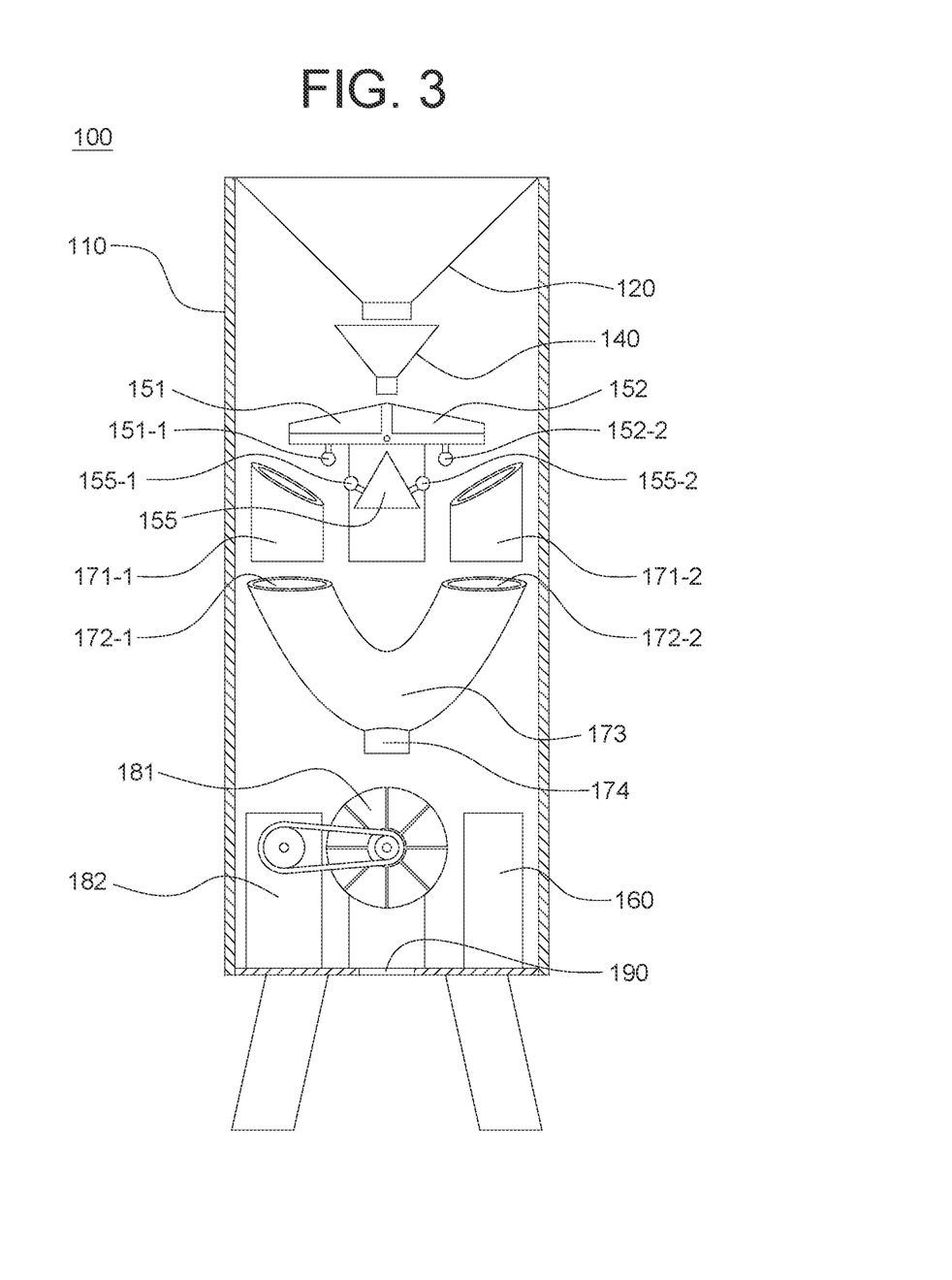
FIG. 3 is a drawing representing a schematic diagram of a cross-section of the self-powered apparatus for measuring precipitation in accordance with one example embodiment of the present invention.

FIG. 3 is a drawing representing a cross-section of the self-powered apparatus for measuring precipitation in accordance with one example embodiment of the present invention.

Firstly, referring to FIG. 3, the self-powered apparatus 100 for measuring precipitation further includes a flow rate relieving opening 140 and a reed switch module 155 with (2-1)-st metal extruding rod 155-1 and (2-2)-nd metal extruding rod 155-2 attached.

More specifically explaining the components of the self-powered apparatus 100 with reference to FIG. 3, the cup module 150 includes: a first cup 151 with a (1-1)-st metal extruding rod 151-1 formed at a lower part thereof, i.e., an outer bottom surface thereof, and a second cup 152 with a (1-2)-nd metal extruding rod 152-2 formed at a lower part thereof, i.e., an outer bottom surface thereof. Next, the guiding module 170 may include (i) a discharge module having a plurality of discharge openings 171-1 and 171-2 and (ii) a joining part 173 having (ii-1) a plurality of inlets 172-1 and 172-2 respectively corresponding to the discharge openings 171-1 and 171-2, (ii-2) a joining space where the precipitation guided through a first inlet 172-1 and the precipitation guided through a second inlet 172-2 are joined, and (ii-3) a triggering point opening 174 through which the precipitation in the joining space is released. Next, the self-powered generator 180 of the self-powered apparatus 100 includes a waterwheel 181, a generating unit 182 and an internal storage battery (not shown).

Herein, FIG. 3 shows that the cup module 150 includes two cups 151 and 152, and accordingly, each of the metal extruding rods 151-1 and 152-2 is formed on each outer bottom surface of the cups 151 and 152, and each of the metal extruding rods 155-1 and 155-2 is also formed on each of oblique surfaces of the reed switch module 155, but they are not limited thereto. In addition, the number of the discharge openings 171-1 and 171-2 and the number of the inlets 172-1 and 172-2 included in the guiding module 170 are also shown to have been two each, but they are not limited thereto.

Specifically, the self-power generation process of the self-powered apparatus 100 is explained as follows. On condition that the precipitation is introduced into the self-powered apparatus 100 through the water collecting vessel 120, the precipitation collected in the water collecting vessel 120 drops downwards from the water collecting vessel 120. The precipitation dropped from the water collecting vessel 120 may be gathered in the flow rate relieving opening 140 which is formed below the water collecting vessel 120 and above the cup module 150. Herein, the flow rate relieving opening 140 relieves the flow rate of the precipitation dropping. Next, the precipitation with relieved flow rate may be dropped downwards where the cup module 150 is located. Herein, FIG. 3 shows that the funnel-shaped flow rate relieving opening 140 is apart from the water collecting vessel 120, but it is not limited thereto, and it can be Siphon which is integrated with the water collecting vessel 120.

Next, the self-powered apparatus 100 for measuring precipitation may accommodate the precipitation dropping from the flow rate relieving opening 140 in the cup module 150. Specifically, the cup module 150 may allow the first cup 151 having a first accommodating space positioned in a first direction from a separation unit formed at a central part thereof and the second cup 152 having a second accommodating space positioned in a second direction from the separation unit formed at the central part thereof to accommodate the precipitation respectively. Firstly, in response to the weight of the precipitation filling the first accommodating space exceeding the predetermined threshold, the first cup 151 tilts to the first direction by the weight of the precipitation to thereby discharge the precipitation accommodated in the first accommodating space through the guiding module 170, i.e., a first discharge opening 171-1, and, in response to the precipitation dropped from the water collecting vessel 120 filling the second accommodating space (i.e., in response to the weight of the precipitation filling the second accommodating space exceeding the predetermined threshold) while the precipitation accommodated in the first accommodating space is discharged through the guiding module 170, i.e., the first discharge opening 171-1, the second cup 152 tilts to the second direction by the weight of the precipitation to thereby discharge the precipitation accommodated in the second accommodating space through the guiding module 170, i.e., a second discharge opening 171-2.

Meanwhile, on the reed switch module 155 formed beneath the cup module 150, the (2-1)-st metal extruding rod 155-1 may be formed on a location capable of being in contact with the (1-1)-st metal extruding rod 151-1, and the (2-2)-nd metal extruding rod 155-2 may be formed on a location capable of being in contact with the (1-2)-nd metal extruding rod 152-2.

In response to the precipitation introduced into the self-powered apparatus 100 for measuring precipitation being accommodated in the first accommodating space and then discharged through the guiding module 170, the (1-1)-st metal extruding rod 151-1 and the (2-1)-st metal extruding rod 155-1 corresponding thereto become in contact with each other and then separated, and in response to the precipitation introduced into the self-powered apparatus 100 for measuring precipitation being accommodated in the second accommodating space and then discharged through the guiding module 170, the (1-2)-nd metal extruding rod 152-2 and the (2-2)-nd metal extruding rod 155-2 corresponding thereto become in contact with each other and then separated, and these processes are repeated.

For example, in response to the weight of the precipitation filling the first accommodating space exceeding the predetermined threshold, the first cup 151 tilts to the first direction by the weight of the precipitation to thereby make first contacts between the (1-1)-st metal extruding rod 151-1 and the (2-1)-st metal extruding rod 155-1, and, in response to the precipitation (dropped from the water collecting vessel 120) filling the second accommodating space while the precipitation accommodated in the first accommodating space is discharged through the guiding module 170, the second cup 152 tilts to the second direction by the weight of the precipitation to thereby make second contacts between the (1-2)-nd metal extruding rod 152-2 and the (2-2)-nd metal extruding rod 155-2. Herein the repetition of the first contacts and the second contacts may generate a pulse signal to be delivered to the electric signaling unit 160. Then, the electric signaling unit 160 can generate electric signal related to the amount of precipitation by using the delivered pulse signal.

Next, according to a movement of the cup module 150 along a predetermined trajectory, the precipitation dropping downwards is discharged through the first discharge opening 171-1 or the second discharge opening 171-2. Specifically, the precipitation dropping downwards from the first cup 151 is discharged to the joining part of the guiding module 170 through the first discharge opening 171-1, and herein, it can be gathered in the joining part 173 through the first inlet 172-1 corresponding to the first discharge opening 171-1, and the precipitation dropping downwards from the second cup 152 is discharged to the joining part of the guiding module 170 through the second discharge opening 171-2, and herein, it can be gathered in the joining part 173 through the second inlet 172-2. The precipitation gathered in the joining part can be moved to the triggering point opening 174 through a joining space tilted in a certain angle to support the precipitation to be moved towards the triggering point opening 174.

Next, the precipitation moved to the triggering point opening 174 is dropped downwards from the triggering point opening 174 and then provided to the self-powered generator 180 formed below the guiding module 170.

Specifically, the precipitation dropping downwards from the triggering point opening 174 strikes at least one surface of the waterwheel 181 included in the self-powered generator 180, and this means that the potential energy of the precipitation is transformed to the kinetic energy corresponding to the rotational motion of the waterwheel 181.

In addition, the generation unit 182 for transforming the kinetic energy of the waterwheel 181 to electric energy is installed at a position close to the waterwheel 181, and an internal storage battery (not shown) may be included in the generation unit 182 to store the generated electric energy. Thereafter, the precipitation used by the self-powered generator 180 to generate the electric energy may be finally discharged outside the self-powered apparatus 100 through the final drainage opening 190 formed at a lower part of the housing 110.

Herein, the display unit 130 may be electrically connected to the electric signaling unit 160 and the self-powered generator 180, and may acquire the electric signal related to the amount of precipitation from the electric signaling unit 160, and may acquire the electric energy for lighting the display light 135 from the self-powered generator 180.

Specifically, in response to detecting that a unit amount of precipitation measured by referring to the electric signal in the pulse form delivered from the reed switch module 155 is closest to a specific reference value among a 1-st precipitation reference value to an n-th precipitation reference value, the electric signaling unit 160 may transmits, to the display unit 130, the electric signal to be used for determining a cardinal number of the display lights 135 to be lighted among the display lights 135 included in the display unit 130 or determining one or more colors of the display lights 135 by referring to the specific reference value. Meanwhile, in response to detecting that the unit amount of precipitation measured by referring to the electric signal in the pulse form delivered from the reed switch module 155 is less than the 1-st precipitation reference value, the electric signaling unit 160 transmits, to the display unit 130, the electric signal that prevents all of the display lights 135 from being lighted.

As one example, the self-powered apparatus 100 for measuring precipitation may be set to allow the electric signaling unit 160 to determine a case where the amount of precipitation per minute corresponds to 1 mm as the 1-st precipitation reference value, determine a case where the amount of precipitation per minute corresponds to 3 mm as a 2-nd precipitation reference value, determine a case where the amount of precipitation per minute corresponds to 5 mm as a 3-rd precipitation reference value, determine a case where the amount of precipitation per minute corresponds to 10 mm as a 4-th precipitation reference value, determine a case where the amount of precipitation per minute corresponds to 20 mm as a 5-th precipitation reference value. Herein, in case the amount of precipitation per minute measured through the reed switch module 155 and the cup module 150 is measured as 4.8 mm, the electric signaling unit 160 may determine that the measured amount of precipitation per minute is closest to the 3-rd precipitation reference value, and by referring to this, may generate an electric signal to light at least part of the display lights 135 included in the display unit 130 and transmit the electric signal to the display unit 130.

In addition, if the amount of precipitation is determined as below the 1-st precipitation reference value, as this is the precipitation that cannot generate sufficient electric energy through the self-powered generator 180, the electric signaling unit 160 may transmit an electric signal for maintaining the light-off state that does not light the display light 135, and if the amount of precipitation per minute is determined as closest to at least one specific precipitation reference value among the 2-nd precipitation reference value to the 5-th precipitation reference value, the electric signaling unit 160 may transmit, to the display unit 130, the electric signal for lighting the display light 135 by using a specific color corresponding to the specific precipitation reference value. Herein, the electric signaling unit 160 may determine a cardinal number of the display lights 135 to be lighted according to a surrounding environment where the self-powered apparatus 100 is installed. For example, in case the self-powered apparatus 100 is installed in farmland or orchard with sufficient visibility, whether the display light is lighted or not can be easily observed by an observer outside, and thus the amount of precipitation can be displayed to the observer outside by lighting one of the plurality of display lights 135 included in the display unit 130, and depending on the case, in case the self-powered apparatus 100 is installed in a space that cannot secure sufficient visibility due to considerable hindrances such as tunnel entrances, it can be supported to display the amount of precipitation outside more clearly by lighting all of the display lights 135 included in the display unit 130. Herein, in the example described above, the cardinal number of the display lights 135 to be lighted are determined based on the visibility, but it is not limited thereto. For example, based on various conditions such as a specific use and/or a location where the self-powered apparatus 100 is installed, the cardinal number and the color of the display lights 135 to be lighted may be determined.

The configuration of the self-powered apparatus 100 has been explained. Hereinafter, a method for controlling the self-powered apparatus 100 in accordance with the present invention will be explained as follows.

Figure 4:
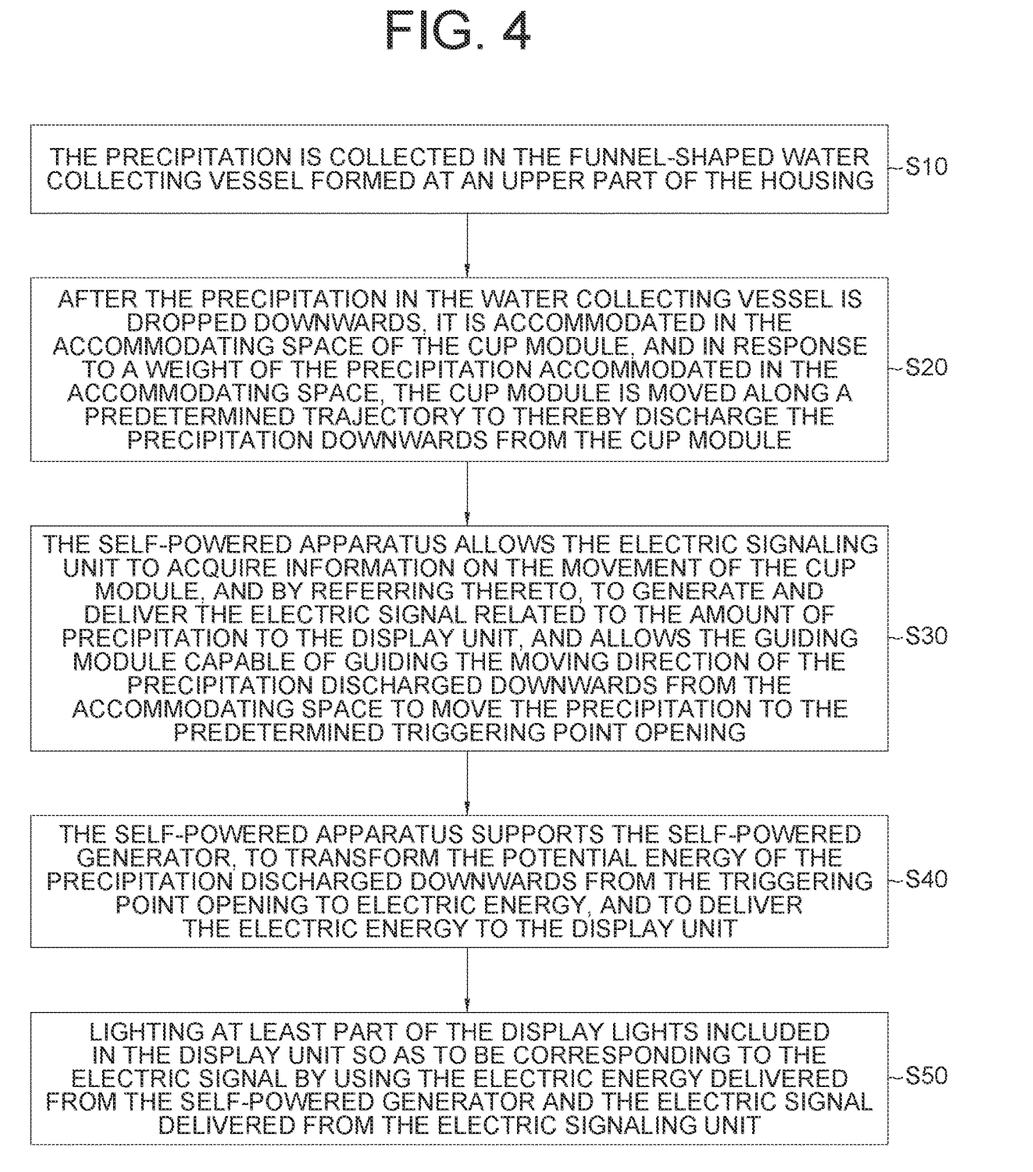
FIG. 4 is a drawing representing a method for controlling the self-powered apparatus for measuring precipitation in accordance with one example embodiment of the present invention.

FIG. 4 is a drawing representing the method for controlling the self-powered apparatus 100 in accordance with one example embodiment of the present invention.

Referring to FIG. 4, upon occurrence of the precipitation, the precipitation introduced into the self-powered apparatus 100 is collected in the funnel-shaped water collecting vessel 120 formed at an upper part of the housing 110 at a step of S10.

Next, after the precipitation collected in the water collecting vessel 120 is dropped downwards, the flow rate reliving opening 140 formed at the lower part of the water collecting vessel 120 may reduce the flow rate of the precipitation. Then, as the precipitation drops downwards from the flow rate relieving opening 140, it is accommodated in the accommodating space of the cup module 150 formed at the lower part of the flow rate relieving opening 140, and in response to a weight of the precipitation accommodated in the accommodating space being larger than a predetermined threshold, the cup module 150 is moved along a predetermined trajectory to thereby discharge the precipitation downwards from the cup module 150 at a step of S20.

Next, the self-powered apparatus 100 allows the electric signaling unit 160, which is formed in a certain area of the inner space and electrically connected to the display unit 130 including the display lights 135 capable of displaying the amount of precipitation, to acquire information on the movement of the cup module 150, and by referring thereto, to deliver the electric signal related to the amount of precipitation to the display unit 130, and allows the guiding module 170 capable of guiding the moving direction of the precipitation discharged downwards from the accommodating space to move the precipitation to the predetermined triggering point opening 174 at a step of S30. Herein, the electric signal can be a control signal for controlling the display lights 135.

Next, the self-powered apparatus 100 supports the self-powered generator 180, formed on a specific area of the inner space and electrically connected to the display unit 130, to transform the potential energy of the precipitation discharged downwards from the triggering point opening 174 to electric energy, and to deliver the electric energy to the display unit 130 at a step of S40.

Next, after lighting at least part of the display lights 135 included in the display unit 130 so as to be corresponding to the electric signal by using the electric energy delivered from the self-powered generator 180 and the electric signal delivered from the electric signaling unit 160, the self-powered apparatus 100 may discharge the precipitation with completed usage through the final drainage opening 190 at a step of S50.

Meanwhile, additionally, such precipitation data may be stored, for example, by installing USB port and rubber stopper, etc. on the side of the apparatus 100. That is, the apparatus 100 can provide a backup function for the precipitation data.

The present invention has an effect of providing a self-powered apparatus for measuring an amount of precipitation and displaying information on the amount of precipitation, without using external power, by improving a structure of the existing apparatus for measuring the amount of precipitation.

The present invention has another effect of providing the self-powered apparatus for measuring the amount of precipitation by being installed without a separate power supply in various places such as regions where there is a risk of waterlogging, flooding of an isolated reservoir and rainfall state of the entrance of an underground tunnel.

The present invention has still another effect of providing a self-powered apparatus for measuring the amount of precipitation and displaying information on the amount of precipitation to the observer immediately without a separate display device.

The present invention has still yet another effect of providing the self-powered apparatus for measuring the amount of precipitation and displaying a notice regarding the amount of precipitation at site in real-time even without the separate power supply and the separate display device, and capable of preventing flood damage in the region with high risk of disaster due to precipitation.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A self-powered apparatus for measuring precipitation, comprising:
   a housing in which an inner space is formed;
   a display unit including one or more display lights capable of displaying an amount of precipitation, wherein the display lights are formed on at least one of outer surfaces of the housing;
   a water collecting vessel, formed within an upper part of the housing, having a funnel-shaped space to which the precipitation is introduced and gathered at a vertex part of the funnel-shaped space;
   a cup module, positioned below the water collecting vessel, having an accommodating space for accommodating the precipitation dropped from the vertex part of the funnel-shaped space of the water collecting vessel, wherein, in response to a weight of the precipitation accommodated in the accommodating space exceeding a predetermined threshold, the cup module is moved along a predetermined trajectory to thereby discharge the precipitation accommodated in the accommodating space downwards;
   an electric signaling unit, formed on a certain area of the inner space, for acquiring information on a movement of the cup module along the predetermined trajectory and generating an electric signal related to the amount of the precipitation, wherein the electric signal serves as a control signal for controlling at least one of the display lights;

a guiding module, positioned below the cup module, for guiding the precipitation discharged from the cup module to be moved to a triggering point opening formed on a lower part thereof;

a self-powered generator, positioned below the guiding module, for converting potential energy of the precipitation to electric energy by using the precipitation falling from the triggering point opening to the self-powered generator, wherein the guiding module is positioned below the cup module and above the self-powered generator; and a final drainage opening, formed at a lower part of the housing such that the precipitation having been used in generating the electric energy by the self-powered generator is finally drained;

wherein the self-powered generator includes: a waterwheel that transforms the potential energy of the precipitation to kinetic energy corresponding to rotational motion as the precipitation dropping downwards from the triggering point opening strikes at least one surface thereof; a generating unit for transforming the kinetic energy to the electric energy; and an internal storage battery capable of storing the electric energy generated by the generating unit, and wherein the cup module includes: a first cup having a first accommodating space positioned in a first direction from a separation unit formed at a central part thereof and a second cup having a second accommodating space positioned in a second direction from the separation unit formed at the central part thereof, and wherein, in response to the weight of the precipitation filling the first accommodating space exceeding the predetermined threshold, the first cup tilts to the first direction by the weight of the precipitation to thereby discharge the precipitation accommodated in the first accommodating space through the guiding module, and, in response to the precipitation dropped from the water collecting vessel filling the second accommodating space while the precipitation accommodated in the first accommodating space is discharged through the guiding module, the second cup tilts to the second direction by the weight of the precipitation to thereby discharge the precipitation accommodated in the second accommodating space through the guiding module, wherein the cup module further includes: a (1-1)-st metal extruding rod formed on a lower surface of the first cup; a (1-2)-nd metal extruding rod formed on a lower surface of the second cup; and a reed switch module formed on a lower surface of the central part of the cup module, wherein a (2-1)-st metal extruding rod is formed on a first surface of the reed switch module such that the (2-1)-st metal extruding rod is in contact with the (1-1)-st metal extruding rod according to tilting of the first cup to the first direction and wherein a (2-2)-nd metal extruding rod is formed on a second surface of the reed switch module such that the (2-2)-nd metal extruding rod is in contact with the (1-2)-nd metal extruding rod according to tilting of the second cup to the second direction, and wherein, in response to the weight of the precipitation filling the first accommodating space exceeding the predetermined threshold, the first cup tilts to the first direction by the weight of the precipitation to thereby make first contacts between the (1-1)-st metal extruding rod and the (2-1)-st metal extruding rod, and, in response to the precipitation dropped from the water collecting vessel filling the second accommodating space while the precipitation accommodated in the first accommodating space is discharged through the guiding module, the second cup tilts to the second direction by the weight of the precipitation to thereby make second contacts between the (1-2)-nd metal extruding rod and the (2-2)-nd metal extruding rod, and wherein the electric signal is generated based on the first contacts and the second contacts in a pulse form.

2. The self-powered apparatus for measuring precipitation of claim 1, wherein, on condition that the display unit is electrically connected to the electric signaling unit and the self-powered generator, the display unit acquires the electric signal related to the amount of precipitation from the electric signaling unit, and acquires the electric energy for lighting at least one of the display lights, and wherein, in response to detecting that a unit amount of precipitation measured by referring to the electric signal in the pulse form delivered from the reed switch module is within a predetermined reference threshold value of a specific reference value among a 1-st precipitation reference value to an n-th precipitation reference value, the electric signaling unit transmits, to the display unit, the electric signal that determines a cardinal number of the display lights to be lighted among the display lights included in the display unit or determines one or more colors of the display lights by referring to the specific reference value, or wherein, in response to detecting that the unit amount of precipitation measured by referring to the electric signal in the pulse form delivered from the reed switch module is less than the I-st precipitation reference value, the electric signaling unit transmits, to the display unit, the electric signal that prevents all of the display lights from being lighted.

3. The self-powered apparatus for measuring precipitation of claim 1, wherein the guiding module includes: a discharge module having a first discharge opening and a second discharge opening for respectively discharging the precipitation dropped from the first cup and the second cup; and a joining part, having a first inlet and a second inlet for receiving the precipitation respectively dropped from the first discharge opening and the second discharge opening, and a joining space where the precipitation guided through the first inlet and the precipitation guided through the second inlet are joined, wherein the joining part releases the precipitation in the joining space through the triggering point opening formed thereon.

4. A self-powered apparatus for measuring precipitation, comprising:

a housing in which an inner space is formed;

a display unit including one or more display lights capable of displaying an amount of precipitation, wherein the display lights are formed on at least one of outer surfaces of the housing;

a water collecting vessel, formed within an upper part of the housing, having a funnel-shaped space to which the precipitation is introduced and gathered at a vertex part of the funnel-shaped space;

a cup module, positioned below the water collecting vessel, having an accommodating space for accommodating the precipitation dropped from the vertex part of the funnel-shaped space of the water collecting vessel, wherein, in response to a weight of the precipitation accommodated in the accommodating space exceeding a predetermined threshold, the cup module is moved along a predetermined trajectory to thereby discharge the precipitation accommodated in the accommodating space downwards;

an electric signaling unit, formed on a certain area of the inner space, for acquiring information on a movement of the cup module along the predetermined trajectory and generating an electric signal related to the amount of the precipitation, wherein the electric signal serves as a control signal for controlling at least one of the display lights;

a guiding module, positioned below the cup module, for guiding the precipitation discharged from the cup module to be moved to a triggering point opening formed on a lower part thereof;

a self-powered generator, positioned below the guiding module, for converting potential energy of the precipitation to electric energy by using the precipitation falling from the triggering point opening to the self-powered generator, wherein the guiding module is positioned below the cup module and above the self-powered generator; and a final drainage opening, formed at a lower part of the housing such that the precipitation having been used in generating the electric energy by the self-powered generator is finally drained;

wherein the self-powered generator includes: a waterwheel that transforms the potential energy of the precipitation to kinetic energy corresponding to rotational motion as the precipitation dropping downwards from the triggering point opening strikes at least one surface thereof; a generating unit for transforming the kinetic energy to the electric energy; and an internal storage battery capable of storing the electric energy generated by the generating unit, and wherein the cup module includes: a first cup having a first accommodating space positioned in a first direction from a separation unit formed at a central part thereof and a second cup having a second accommodating space positioned in a second direction from the separation unit formed at the central part thereof, and wherein, in response to the weight of the precipitation filling the first accommodating space exceeding the predetermined threshold, the first cup tilts to the first direction by the weight of the precipitation to thereby discharge the precipitation accommodated in the first accommodating space through the guiding module, and, in response to the precipitation dropped from the water collecting vessel filling the second accommodating space while the precipitation accommodated in the first accommodating space is discharged through the guiding module, the second cup tilts to the second direction by the weight of the precipitation to thereby discharge the precipitation accommodated in the second accommodating space through the guiding module, wherein the cup module further includes: a (1-1)-st metal extruding rod formed on a lower surface of the first cup; a (1-2)-nd metal extruding rod formed on a lower surface of the second cup; and a reed switch module formed on a lower surface of the central part of the cup module, wherein a (2-1)-st metal extruding rod is formed on a first surface of the reed switch module such that the (2-1)-st metal extruding rod is in contact with the (1-1)-st metal extruding rod according to tilting of the first cup to the first direction and wherein a (2-2)-nd metal extruding rod is formed on a second surface of the reed switch module such that the (2-2)-nd metal extruding rod is in contact with the (1-2)-nd metal extruding rod according to tilting of the second cup to the second direction, and wherein, in response to the weight of the precipitation filling the first accommodating space exceeding the predetermined threshold, the first cup tilts to the first direction by the weight of the precipitation to thereby make first contacts between the (1-1)-st metal extruding rod and the (2-1)-st metal extruding rod, and, in response to the precipitation dropped from the water collecting vessel filling the second accommodating space while the precipitation accommodated in the first accommodating space is discharged through the guiding module, the second cup tilts to the second direction by the weight of the precipitation to thereby make second contacts between the (1-2)-nd metal extruding rod and the (2-2)-nd metal extruding rod, and wherein the electric signal is generated based on the first contacts and the second contacts in a pulse form, wherein, on condition that the display unit is electrically connected to the electric signaling unit and the self-powered generator, the display unit acquires the electric signal related to the amount of precipitation from the electric signaling unit, and acquires the electric energy for lighting at least one of the display lights, and wherein, in response to detecting that a unit amount of precipitation measured by referring to the electric signal in the pulse form delivered from the reed switch module is within a predetermined reference threshold value of a specific reference value among a 1-st precipitation reference value to an n-th precipitation reference value, the electric signaling unit transmits, to the display unit, the electric signal that determines a cardinal number of the display lights to be lighted among the display lights included in the display unit or determines one or more colors of the display lights by referring to the specific reference value, or wherein, in response to detecting that the unit amount of precipitation measured by referring to the electric signal in the pulse form delivered from the reed switch module is less than the l-st precipitation reference value, the electric signaling unit transmits, to the display unit, the electric signal that prevents all of the display lights from being lighted, wherein the guiding module includes: a discharge module having a first discharge opening and a second discharge opening for respectively discharging the precipitation dropped from the first cup and the second cup; and a joining part, having a first inlet and a second inlet for receiving the precipitation respectively dropped from the first discharge opening and the second discharge opening, and a joining space where the precipitation guided through the first inlet and the precipitation guided through the second inlet are joined, wherein the joining part releases the precipitation in the joining space through the triggering point opening formed thereon, wherein the self-powered apparatus for measuring precipitation further comprises: a flow rate relieving opening, installed below the water collecting vessel and above the cup module, for relieving a flow rate of the precipitation dropped from the water collecting vessel and for dropping the precipitation toward the cup module with a relieved flow rate.

* * * * *